US006914973B2

(12) United States Patent
Marsico (10) Patent No.: US 6,914,973 B2
(45) Date of Patent: Jul. 5, 2005

(54) METHODS AND SYSTEMS FOR IMPROVING TRUNK UTILIZATION FOR CALLS TO PORTED NUMBERS

(75) Inventor: Peter Joseph Marsico, Chapel Hill, NC (US)

(73) Assignee: Tekelec, Calabasas, CA (US)

( * ) Notice: Subject to any disclaimer, the term of this patent is extended or adjusted under 35 U.S.C. 154(b) by 88 days.

(21) Appl. No.: 10/179,859

(22) Filed: Jun. 25, 2002

(65) Prior Publication Data

US 2003/0235285 A1 Dec. 25, 2003

(51) Int. Cl.[7] ............................................... H04M 7/00
(52) U.S. Cl. ........................... 379/221.13; 379/220.01
(58) Field of Search ............................ 379/219, 220.01, 379/221.01, 221.08, 221.09, 221.1, 221.13, 229, 230; 370/352, 354, 400, 401, 410, 466, 467

(56) References Cited

U.S. PATENT DOCUMENTS

| 5,949,871 | A | 9/1999 | Kabay et al. |
| 6,438,223 | B1 | 8/2002 | Eskafi et al. |
| 6,570,855 | B1 | 5/2003 | Kung et al. |
| 6,724,801 | B1 | 4/2004 | Sylvain |
| 2001/0040957 | A1 | 11/2001 | McCann et al. |
| 2002/0080947 | A1 * | 6/2002 | Mikhailov et al. ..... 379/221.13 |

FOREIGN PATENT DOCUMENTS

WO   WO 02/21857 A1   3/2002

* cited by examiner

Primary Examiner—Benny Tieu
(74) Attorney, Agent, or Firm—Jenkins, Wilson & Taylor P.A (57) ABSTRACT

Methods and systems for improving trunk utilization for calls to ported numbers are disclosed. A method for improving media trunk utilization for calls directed to ported numbers includes receiving a call setup message associated with the call in a communications network and determining whether the call setup message is directed to a ported number. In response to determining that the call is directed to a ported number, called party information is extracted from the call setup message. A lookup is performed in a number portability database using the called party information to locate a routing number for the called party. A media trunk is selected for the call based on the routing number. The call is then routed through a media gateway associated with the media trunk.

41 Claims, 10 Drawing Sheets

METHODS AND SYSTEMS FOR IMPROVING TRUNK UTILIZATION FOR CALLS TO PORTED NUMBERS

TECHNICAL FIELD

The present invention relates to trunk utilization for calls to ported numbers. More particularly, the present invention relates to methods and systems for improving trunk utilization for calls to ported numbers.

BACKGROUND ART

Number portability (NP) gives telephone service subscribers the ability to change local service providers without changing directory numbers. As used herein, the term "number portability" includes service provider portability, which allows subscribers to change local telephone service providers without changing directory numbers; service portability, which allows subscribers to change from one type of service to another (e.g., analog to integrated services digital network (ISDN) without changing phone numbers; geographic portability, which allows subscribers to move from one physical location to another without changing directory numbers, or any other type of service-related portability in which a subscriber desires to keep the same directory number.

In a non-NP environment, a telephone number performs two basic functions: it identifies the customer, and it provides the network with information necessary to route a call to that customer. Number portability solutions separate these two functions, and thereby provide the means for customers to keep the same directory number when changing one of the above-mentioned aspects of telephone service. By separating these two functions, NP gives service provides the flexibility to respond to pricing and service changes offered by rival carriers. Accordingly, it is anticipated that NP will promote local-exchange competition, which in turn will benefit all customers, as has already been the case with the long-distance market. As NP solutions are implemented, competition in the local-exchange market is expected to drive down the cost of service, encourage technological innovation, stimulate demand for telecommunications services, and boost economic growth.

While intelligent network (IN) and advanced intelligent network (AIN) solutions to the problem of number portability exist, these solution are query and response based. Consequently, end office (EO) and mobile switching center (MSC) facilities must be upgraded to support such NP functionality, which is expensive both from a financial standpoint as well as a resource management perspective. For example, one wireless network operator in the United States has recently estimated that approximately 20% of their MSC resources are currently being monopolized by NP query/response related processing.

Triggerless number portability (TNP) support gives service providers a method to route calls to ported numbers without having to upgrade their signaling switch (EO or MSC) software. With existing trigger based IN/AIN NP solutions, service providers are required to modify their EO and MSC equipment so as to incorporate the ability to generate and receive NP query and response messages, respectively. An internally generated NP trigger will cause an EO/MSC node to launch an NP query to an NP database that resides in the signaling network. The EO/MSC node routes a call based on an location routing number (LRN) returned from NP database lookup. Triggerless number portability routes calls to ported numbers without requiring this query and response mechanism.

Commonly-assigned, co-pending U.S. patent application Ser. No. 09/503,541, entitled Methods and Systems For Routing Signaling Messages Associated With Ported Subscribers In A Telecommunications Network (hereinafter, the "TNP Patent Application"), the disclosure of which is incorporated herein by reference in its entirety discloses a triggerless number portability solution. The triggerless NP solution described in the TNP Patent Application reduces the need for updates or upgrades to end offices or mobile switching centers in a network. Instead, an ISDN user part (ISUP) initial address message (IAM) sent from an EO or MSC is intercepted by a triggerless-NP-equipped signal transfer point or signaling gateway routing node and is modified to include the appropriate LRN if the call is to a ported number.

Figure 1:
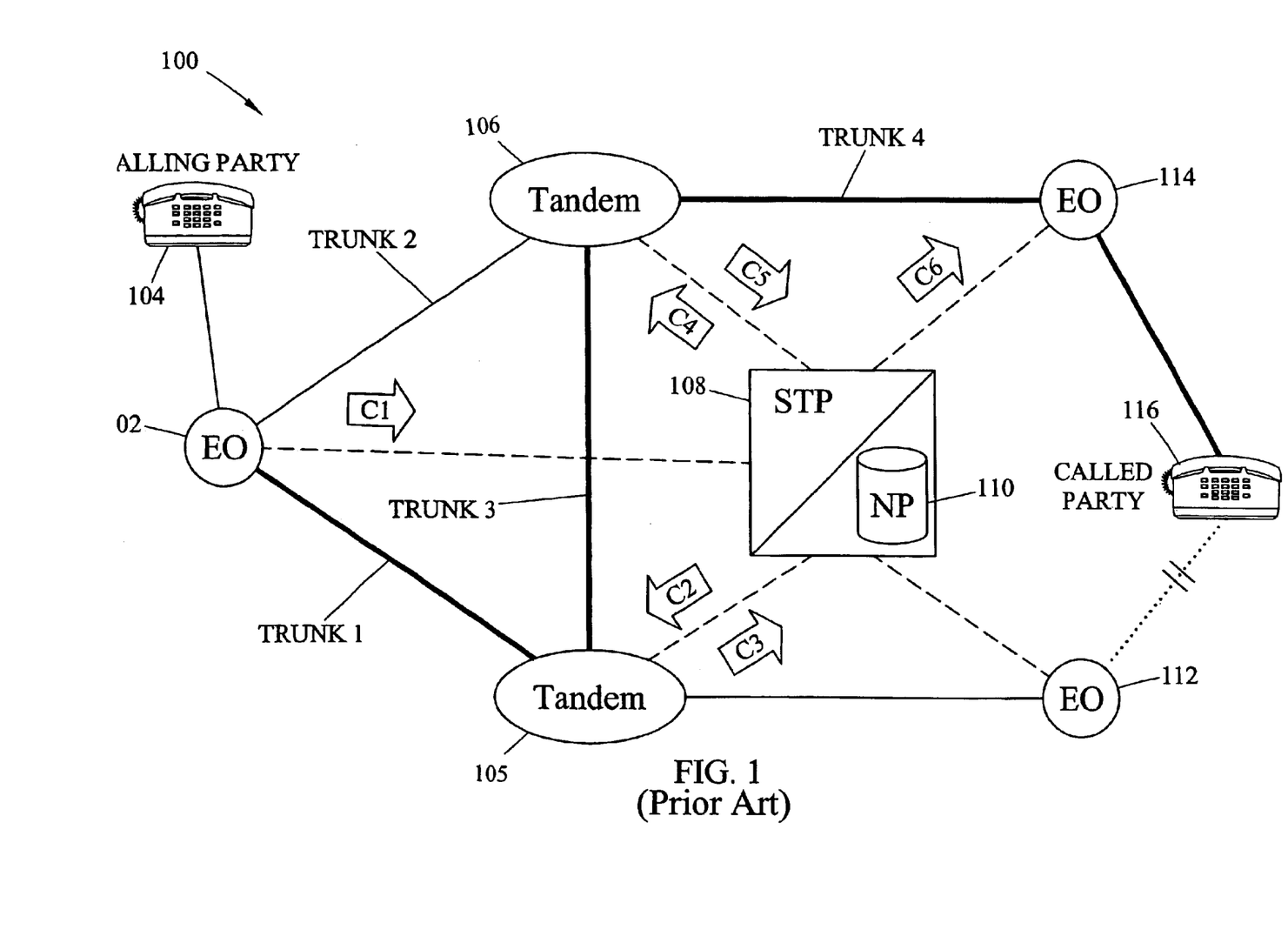
FIG. 1 is a network diagram illustrating a circuit switched triggerless number portability solution and associated signaling message flows.

One problem with conventional triggerless number portability solutions is inefficient trunk utilization. FIG. 1 illustrates an exemplary wireline communication network and messaging intended to illustrate a conventional TNP solution. In the illustrated example, wireline communications network 100 includes an originating EO 102 associated with a calling party 104, two access tandem switches 105 and 106 (e.g., CLASS 4 offices), an STP 108 with a TNP subsystem 110, a donor EO 112, a recipient EO 114, and a called party 116 that has been ported from the donor EO to the recipient EO. The dashed lines in FIG. 1 indicate signaling communication links, and the solid lines indicate voice trunks.

Messages C1 through C6 represent ISUP signaling that occurs during the course of call setup (e.g., IAM messages). In the scenario illustrated in FIG. 1, originating EO 102 uses it's internal routing data to address the call setup message to donor EO 112, because originating EO 102 is not aware that the called party has been ported. As such, originating EO 102 selects and reserves a voice trunk (trunk 1) connected to tandem office 105 and launches a call setup signaling message, C1, which is addressed to tandem office 105.

Message C1 is received by STP 108, which performs a number portability lookup. In this example, the NP lookup at STP 108 reveals that called party 116 has been ported from donor EO 112 to receiving EO 114. Consequently, an appropriate location routing number (LRN) is inserted into the call setup message, and the modified call setup message (C2) is routed to tandem office 104. Tandem office 105 receives message C2, selects and reserves voice trunk 3, and launches call setup message C3. Message C3 is received by STP 108 and through-switched to tandem office 106 as message C4. Tandem office 106 receives the message C4 and launches a call setup message C5, which is routed to receiving EO 114 as call setup message C6.

At this point, a significant shortcoming/inefficiency in this triggerless LNP solution becomes apparent. That is, trunk 1 has already been reserved by originating EO 102 prior to the determination that the called party has been ported and is no longer serviced by donor EO 112. Consequently, tandem office 105 and voice trunks 1, 3 and 4 are involved in the call even though the most efficient/direct voice trunk path would only involve trunks 2 and 4.

Therefore, what is needed is a triggerless NP solution that improves the utilization of voice trunks in a telecommunications network environment.

DISCLOSURE OF THE INVENTION

According to one aspect, the present invention includes a triggerless call processing and routing node capable of performing triggerless routing of signaling messages associated with calls to ported subscribers. The triggerless call processing and routing node includes a communication module capable of transmitting and receiving data packets over one or more signaling networks. A discrimination function processes incoming call setup messages and subsequently directs messages to a number portability (NP) database manager. The NP database manager searches an NP database based on called party information contained within each call signaling message. Because the routing node intercepts a call setup-type signaling message and administers an NP database lookup transaction, no NP translation service query or response messages are required. Moreover, rather than routing the message to a tandem office formerly in the call path for the ported number, the triggerless call processing and routing node routes the message with the new LRN to a media gateway controller. The media gateway controller instructs media gateways to reserve voice trunks only in the path from the originating end office to the recipient or destination end office. As a result, trunk utilization for calls to ported subscribers is improved.

Accordingly, it is an object of the invention to provide methods and systems for improving voice trunk utilization for calls to ported subscribers.

It is another object of the present invention to provide a method for circuit switched EO or MSC facilities to establish calls to a ported subscriber using a packet switched voice network.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

According to one embodiment, the present invention includes a triggerless number portability call processing system that improves voice trunk utilization. The TNP system includes a triggerless number portability call processing node, which is described and illustrated herein as a collection of processes and subsystems that execute on cards to perform triggerless number portability processing. It is understood that these cards each may include one or more general purpose microprocessors and memory devices. Accordingly, the processes, databases, applications, and subsystems described herein may be implemented by computer-executable instructions embodied in a computer-readable medium. Alternatively, the processes, databases, applications, and subsystems described herein may be implemented in hardware as application-specific integrated circuits (ASICs). Any combination of hardware, software, or hardware and software for performing triggerless number portability processing as described herein is intended to be within the scope of the invention.

Triggerless NP Call Processing Node Architecture

Figure 2:
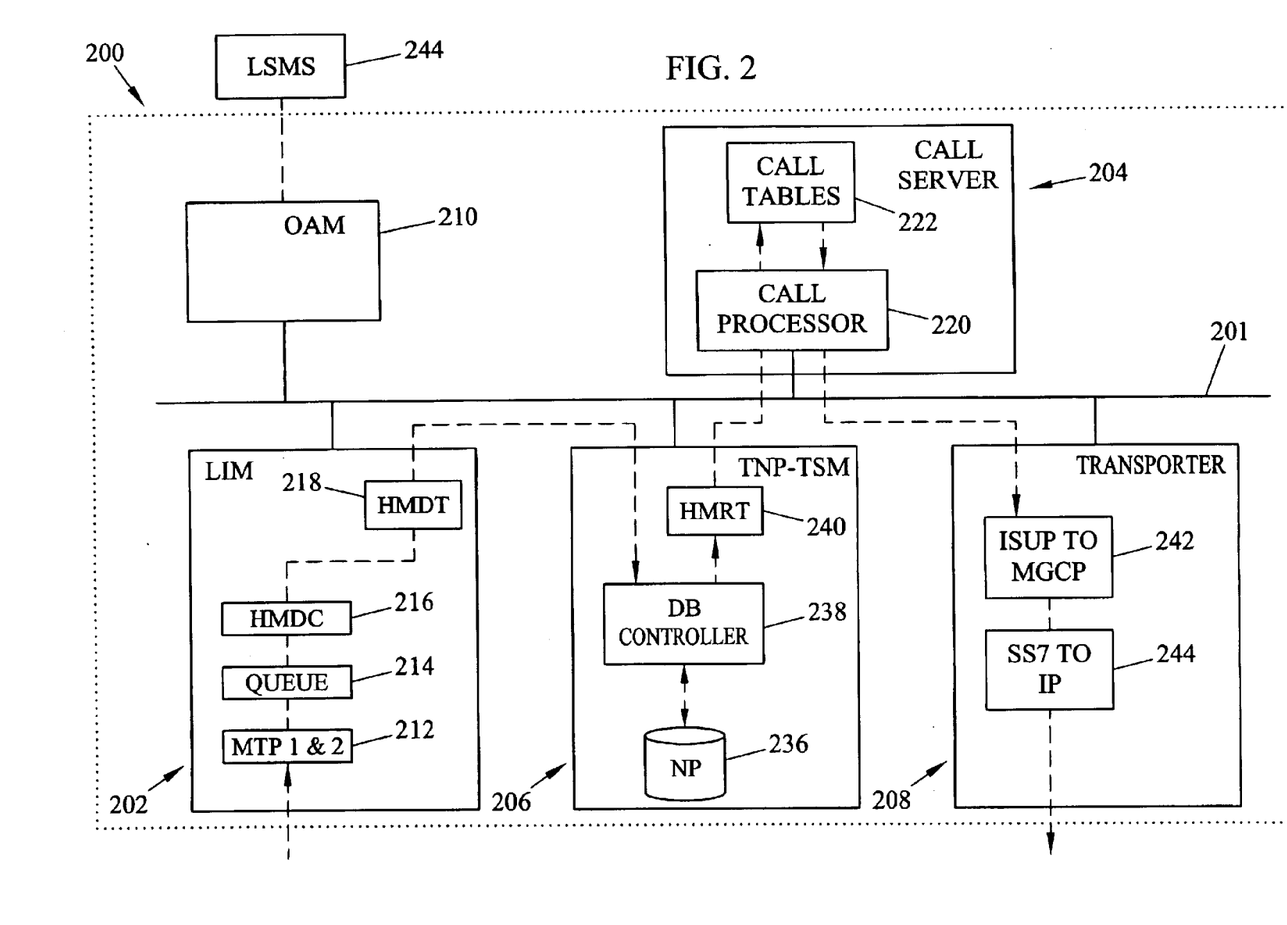
FIG. 2 is a block diagram illustrating an exemplary internal architecture of a triggerless NP call processing node according to an embodiment of the present invention.

FIG. 2 is a block diagram of a scalable call processing node architecture that includes some internal processing modules in common with the scalable call processing node described in commonly-assigned, copending U.S. patent application Ser. No. 09/658,522, filed Sep. 8, 2000, (hereinafter, "the Scalable Call Processing Node Patent Application"), the disclosure of which is incorporated herein by reference in its entirety. Briefly, the scalable call processing node described in the Scalable Call Processing Node Patent Application includes processing modules for performing signaling message routing or STP functionality, call processing or MGC functionality, and message transport, signaling gateway functionality. In the embodiment illustrated in FIG. 2, TNP call processing node 200 includes triggerless number portability processing functionality, in addition to this scalable call processing functionality.

Referring to FIG. 2, one embodiment of a triggerless number portability call processing node 200 includes a plurality of communication and/or processor cards that are connected to each other via interprocessor message transport (IMT) bus 201. Exemplary cards that may be included in call processing node 200 include a link interface module 202, a call server module 204, a TNP translation service module 206, a transporter module 208, and an operations, administration, and maintenance (OAM) module 210. Each of these modules will now be explained in more detail.

Link interface module 202 may comprise a signaling system 7 (SS7) link interface module (LIM). LIM 202 may include processes for sending and receiving SS7 signaling messages over SS7 signaling links and internally routing SS7 signaling messages based on one or more parameters in the SS7 signaling messages. For example, LIM 202 may perform MTP routing and internal routing of SCCP and other types of messages that require internal processing by TNP call processing node 200. In FIG. 2, LIM 210 includes a lower layer message transfer part (MTP) function 212 that provides MTP layer 1 and 2 functionality. That is, MTP function 212 provides the facilities necessary to send and receive digital data over a particular physical medium. MTP function 212 may also perform error detection, error correction, message sequencing, and retransmission of SS7 message packets. Also included on LIM 210 is an I/O buffer or queue 214 for providing temporary buffering of incoming and outgoing signaling message packets.

An HMDC message discrimination function 216 is responsible for examining incoming signaling messages and determining if TNP service is indicated. In one embodiment, TNP service is indicated if message discrimination function 216 determines that a received signaling message is an ISDN user part (ISUP) initial address message (IAM). Such a determination may be made through examination of a service indicator (SI) parameter (e.g., ISUP SI=5) and a message type parameter within a received SS7 signaling message packet. Other SS7 message parameters, such as originating point code (OPC), destination point code (DPC), circuit identification code (CIC), and/or FCI number portability translation indicator may also be examined by discrimination function 216 in order to determine whether TNP service is indicated for a received signaling message. An HMDT message distribution process 218 handles the internal routing of message packets that require additional processing (e.g., TNP service).

Exemplary link interface modules suitable for use with the present invention include two-port link interface modules, eight-port link interface modules, twenty-four-port ATM link interface modules, and data communications modules (DCMs). Two-port link interface modules are capable of handling two 56 kbps SS7 signaling links. Eight-port LIMs are capable of handling eight 56 kbps SS7 signaling links. Two-port data communication modules (DCMs) are capable of communicating SS7, as well as other signaling protocols, over one or more Internet protocol (IP) socket connections. Finally, twenty-four-port ATM link interface modules are capable of processing 24 SS7 over ATM signaling links.

Exemplary hardware suitable for implementing such link interface modules may be similar to hardware on LIMs and DCMs available from Tekelec, Inc., of Calabasas, Calif. (hereinafter, "Tekelec") in the EAGLE® STP or the IP$^7$ SECURE GATEWAY™ products. A LIM or DCM card may contain more functional processes than those described above. The above discussion is limited to LIM or DCM functionality associated with the processing of in bound signaling messages. Briefly, such hardware includes a printed circuit board with an application processor, a communications processor, and a dual-port memory mounted thereon. The application processor runs application software, such as SS7 routing software. The communications processor sends and receives messages over bus 202. The dual-port memory is used for communicating messages between processors.

Figure 3:
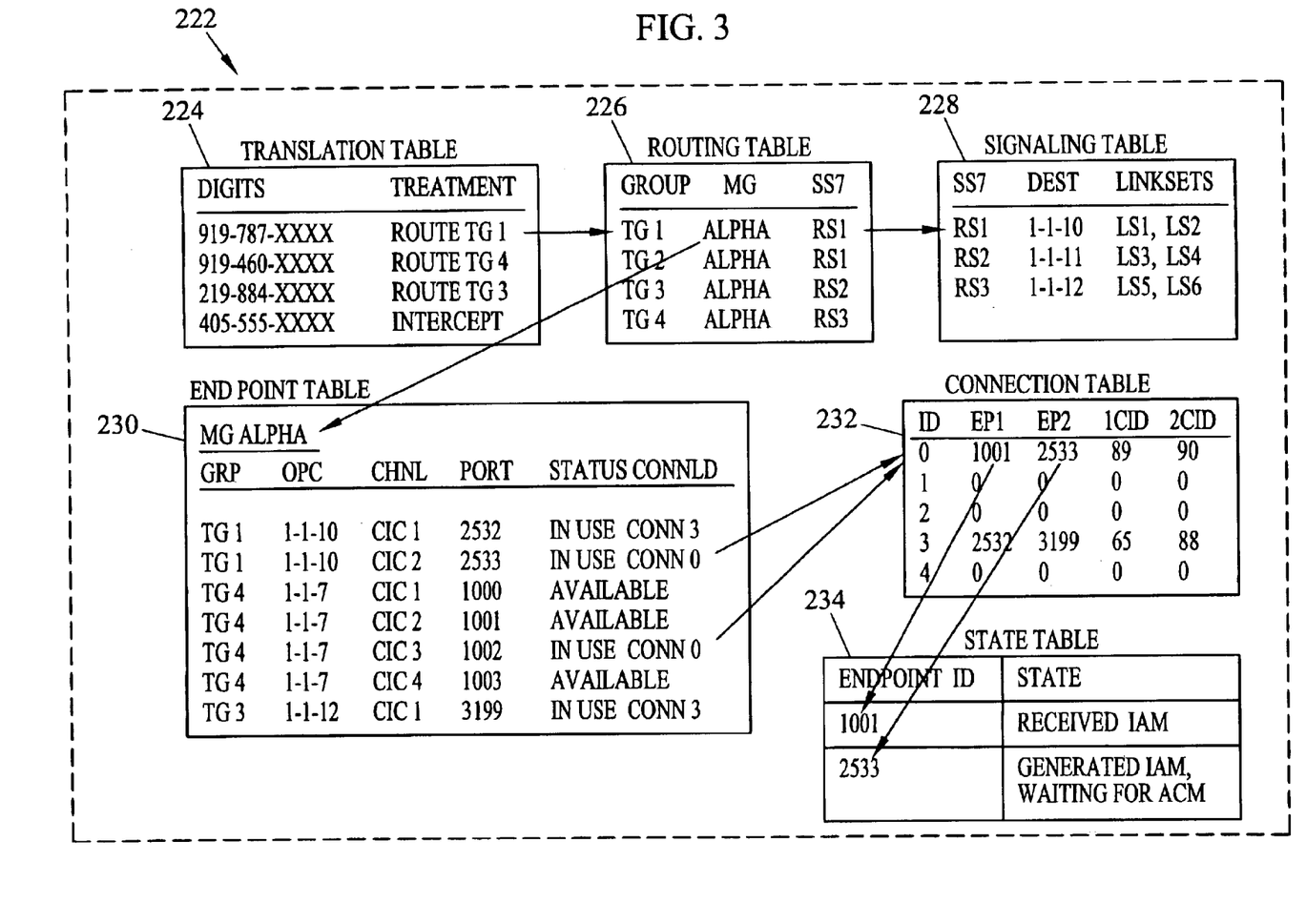
FIG. 3 illustrates exemplary call tables used by a call server module according to an embodiment of the present invention.

Call server module 204 includes processes and databases for performing call control related functions. For example, call server module 204 may include one or more databases for performing trunk selection based on parameters in a received ISUP message. Call server module 204 may also store call state information, such as the sequence of ISUP messages received for a given call. Call server module 204 includes call processor 220 and one or more call tables 222 for maintaining call state information and setting up a connection using a media gateway. FIG. 3 illustrates exemplary call tables 222 that may be stored in memory on call server module 204. Call tables 222 include a translation table 224, a routing table 226, a signaling table 228, an endpoint table 230, a connection table 232, and a state table 234. Each of these tables may be variously configured. In the illustrated embodiment, translation table 224 maps dialed digits to trunk groups. Routing table 226 maps trunk groups to media gateways and SS7 routing sets. Signaling table 228 maps SS7 routing sets to destination point codes and linksets. Routing table 226 and signaling table 228 are used to generate SS7 call signaling messages relating to a call. Endpoint table 230 and connection table 232 contain information for establishing a connection in a media gateway. Finally, state table 234 stores call state information for each endpoint in a media gateway.

Referring back to FIG. 2, TNP translation service module 206 includes one or more data structures and processes for performing number portability translations, such as local or mobile number portability translations. For example, TNP translation service module 206 may be configured to perform triggerless number portability translations in response to ISUP messages received from an end office or mobile switching center. Technology for performing triggerless number portability at an signal transfer point is described in the above-referenced TNP Patent Application. This technology will now be described in more detail.

In general, a TNP-TSM card includes the database and database control processes necessary to achieve the triggerless number portability translation functionality of the present invention. In the embodiment illustrated in FIG. 2, TNP-TSM module 240 includes a number portability translation database 236, a database controller 238, and a message routing function 240. Translation database 236 stores routing address information associated with one or more service subscribers. Once again, service subscribers as defined herein, includes both wireless service subscribers and wireline service subscribers. The routing address information stored in number portability translation database 236 is indexed or keyed on a service subscriber identifier such as a dialed telephone number or a mobile subscriber identifier (e.g., mobile subscriber ISDN number (MSISDN)) international mobile station identifier (IMSI). In a SIP signaling protocol environment, a service subscriber identifier may include an electronic mail (email) address, an IP address, or other functionally similar subscriber identification parameter.

Each translation entry (or range of entries) may be associated with a network routing address or network routing address alias. In an SS7 signaling network context, a network routing address may be a point code (PC) identifier. A network routing address alias may be a location routing number (LRN). An LRN is one type of identifier that may be used to identify the end office or mobile switching center that is currently serving a service subscriber. An LRN is not a true network address; rather, an LRN is an identifier that has been associated with a signaling point within an SS7 signaling network.

Network routing address alias identifiers require at least one additional translation processing step in order to obtain a true network address (e.g., an SS7 MTP point code address, an Internet protocol address, etc.). For example, one type of routing address alias translation processing is known as global title translation processing. In global title translation, a routing alias parameter known as a global title address is translated to obtain a true SS7 network routing address. In an IP network context, a network routing address may be an IP address. A network routing address alias may be a hostname, a uniform resource locator, email address, or other functionally similar identifier. Exemplary number portability translation data that may be included in an NP translation database 236 is shown below in Table 1.

TABLE 1

Sample Number Portability Translation Data

| Called Subscriber Identifier | LRN |
|---|---|
| 9193803814 | 9197870000 |
| 9192443025 | 9194600000 |
| 2125453300 | 2198840000 |

In Table 1, the first column contains called subscriber identifiers used to locate each entry. The second column contains location routing numbers used to indicate the end office or MSC currently serving each subscriber.

Database controller 238 contains the logic necessary to decode a call setup signaling message (e.g., ISUP IAM, SIP Invite, H.225 Setup), extract the appropriate called subscriber information from the message, and perform an associated NP database lookup. Furthermore, controller 238 is responsible for modifying the signaling message based on the results of the NP database lookup.

Message handling and routing (HMRT) process 240 routes messages received by call processing node 200 after the messages are processed by controller 238. According to one embodiment of the present invention, HMRT process 246 may be provisioned to perform call server selection based on one or more parameters in a received call signaling message. Exemplary parameters that may be used to perform call server selection are the OPC, DPC, and CIC codes contained in an incoming SS7 message.

Transporter module 208 receives messages from call server module 204 and translates the messages between SS7 and predetermined IP telephony or other protocols, depending on whether the destination of a message is an MG, an MGC, a tone and announcement server, an H.323 gateway or gatekeeper, or an SS7 network element. For example, transporter module 208 may translate between ISUP and one or more of the following protocols:

MGCP, as described in Arango et al., RFC 2705, "Media Gateway Control Protocol (MGCP) version 1.0," (October 1999);

Session initiation protocol (SIP), as described in Handley et al., RFC 2543, "SIP: Session Initial Protocol," (March 1999);

Control Protocol for Multimedia Communication, as described in ITU Recommendation H.245, "Control Protocol for Multimedia Communication," ITU, July, 2001; and tone and announcement server-related protocols, such as MEGACO, as described in Cuervo et al., IETF RFC 3015, "MEGACO Protocol Version 1.0," November 2000, the disclosures of each of which are incorporated herein by reference in their entirety.

For SS7 messages directed to IP nodes and IP-encapsulated SS7 messages directed to SS7 nodes, transporter module 208 may perform SS7 encapsulation and decapsulation according to any suitable signaling adapter layer protocol. For example, transporter module 208 may implement one or more of the following IP signaling transport protocols:

Tekelec's Transport Adapter Layer Interface (TALI), as described in Benedyk et al., IETF RFC 3094, "Tekelec's Transport Adapter Layer Interface," April 2001;

M3UA over SCTP, as described in Sidebottom et al., IETF Internet Draft, "SS7 MTP3 User Adaptation Layer (M3UA)," draft-ietf-sigtran-M3UA-12.txt, February 2002 and Stewart et al., IETF RFC 2960, "Stream Control Transmission Protocol (SCTP)," October 2000, respectively; and M2PA over SCTP, as described in George et al., IETF Internet Draft, "SS7 MTP2-User Peer to Peer User Adaptation Layer," draft-ietf-sigtran-m2pa-os.txt, May 2002, and IETF RFC 2960, respectively, the disclosures of each of which are incorporated herein by reference in their entirety.

In the illustrated example, transporter module 208 includes ISUP to MGCP converter 242 for converting between ISUP and MGCP protocols and SS7 to IP converter 244 for converting between SS7 and IP protocols.

OAM module 210 provides for provisioning and maintenance of the remaining modules of TNP call processing node 200. For example, OAM module 210 may include interfaces for communication with an external user terminal or platform to allow provisioning of various data, including NP translation data.

A local service management system 244 communicates with OAM 210 to provision number portability databases within TNP call processing node 200. For local wireline number portability service, an LSMS system a Number Portability Administration Center (NPAC) to receive number portability data. As such, an LSMS acts as the interface between carrier networks and the NPAC. In a typical implementation, an LSMS receives and stores ported subscriber information from the NPAC and then, in turn, is responsible for downloading this ported subscriber information to all the NP databases that it serves. As the interaction between an NPAC and an LSMS is not particularly relevant to the present invention, a detailed discussion of such NPAC-LSMS system functionality will not be presented herein. It should suffice to state that an LSMS or functionally similar provisioning system maintains NP database 242 with the most current ported subscriber information available at any given time.

Triggerless NP Call Processing Node Operation

Figure 4:
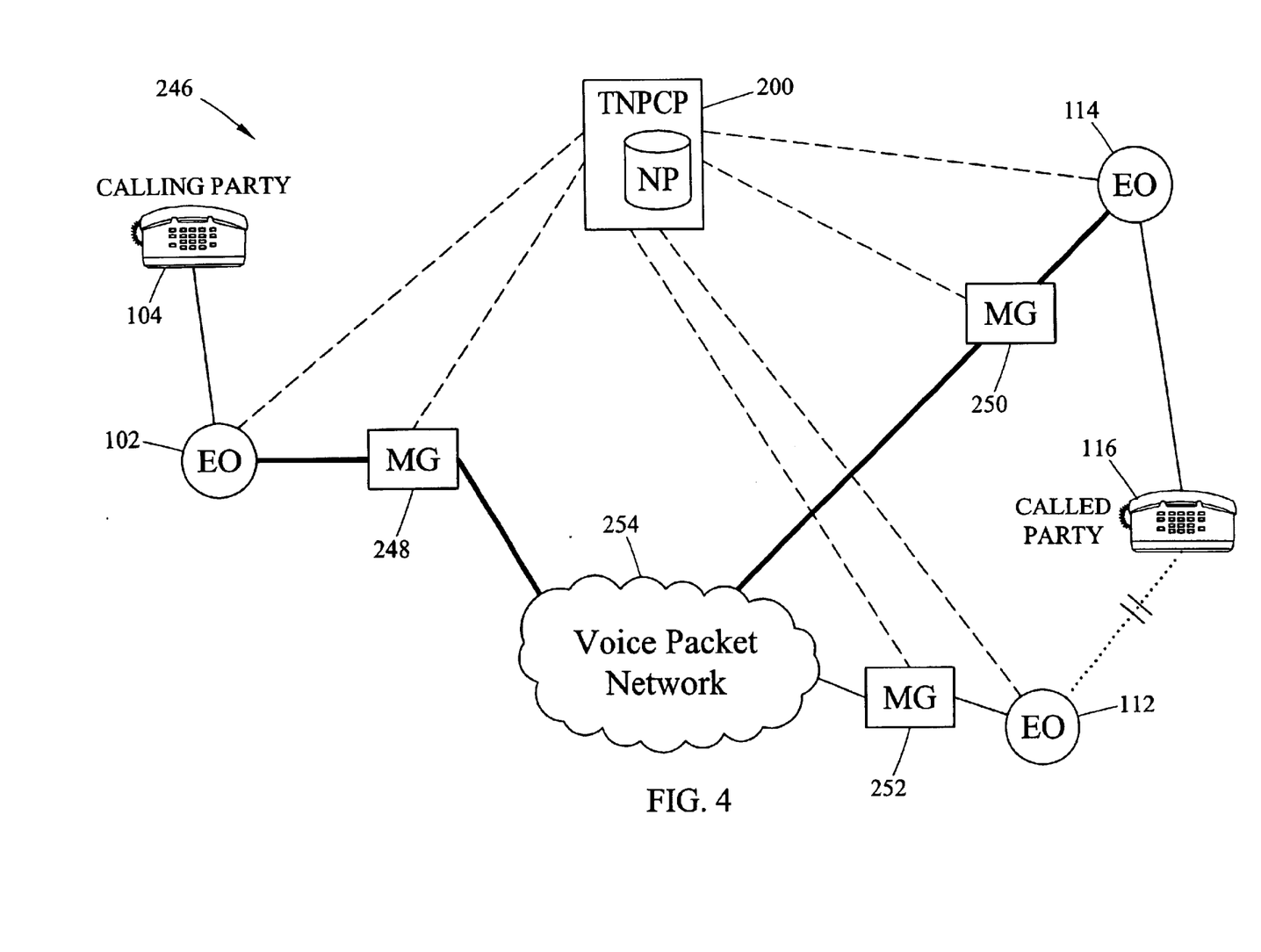
FIG. 4 is a network diagram illustrating a sample implementation of a triggerless NP call processing system according to an embodiment of the present invention.

Illustrated in FIG. 4 is an exemplary communications network 246, which includes a triggerless NP call processing node 200 according to an embodiment of the present invention. In the illustrated example, network 246 also includes an originating end office (EO) 102 and associated calling party 104, a destination EO 114 and associated ported called party 116, and a donor EO 112 that was formerly associated with called party 116. Voice or bearer traffic associated with EO 102 is trunked through a media gateway (MG) 248, Bearer traffic associated with EO 114 is trunked through an MG 250. Bearer traffic associated with EO 112 is trunked through an MG 252. MGs 248, 250, and 252 are connected via a voice-grade packet network 254, through which bearer traffic may be communicated. Triggerless number portability call processing node 200 communicates call setup (e.g., ISUP, SIP, H.225, MGCP) and other types of signaling information between each of the end office and media gateway nodes in the network.

Figure 5A:
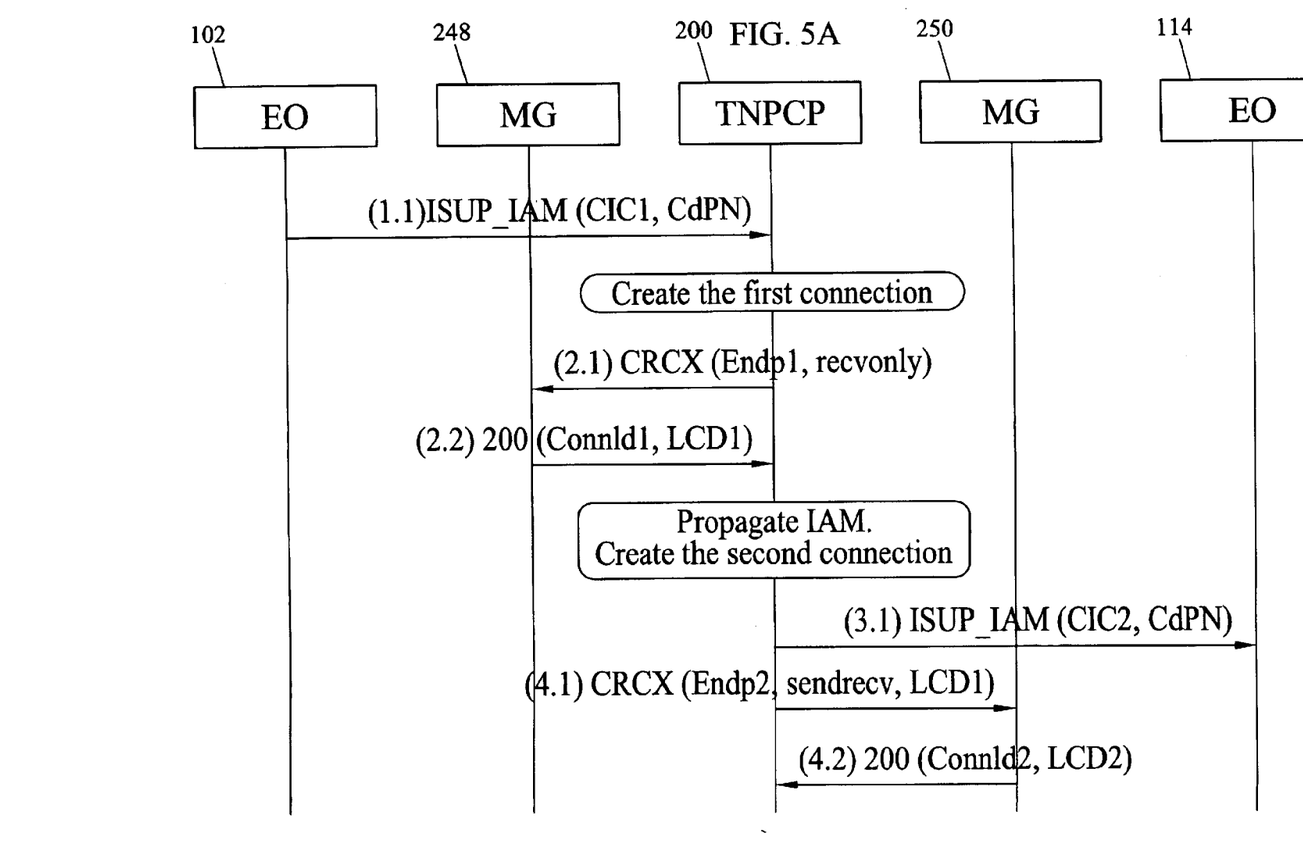
FIGS. 5A and 5B are a message flow diagram illustrating exemplary call setup messaging associated with a triggerless NP call processing system according to an embodiment of the present invention.
Figure 5B:
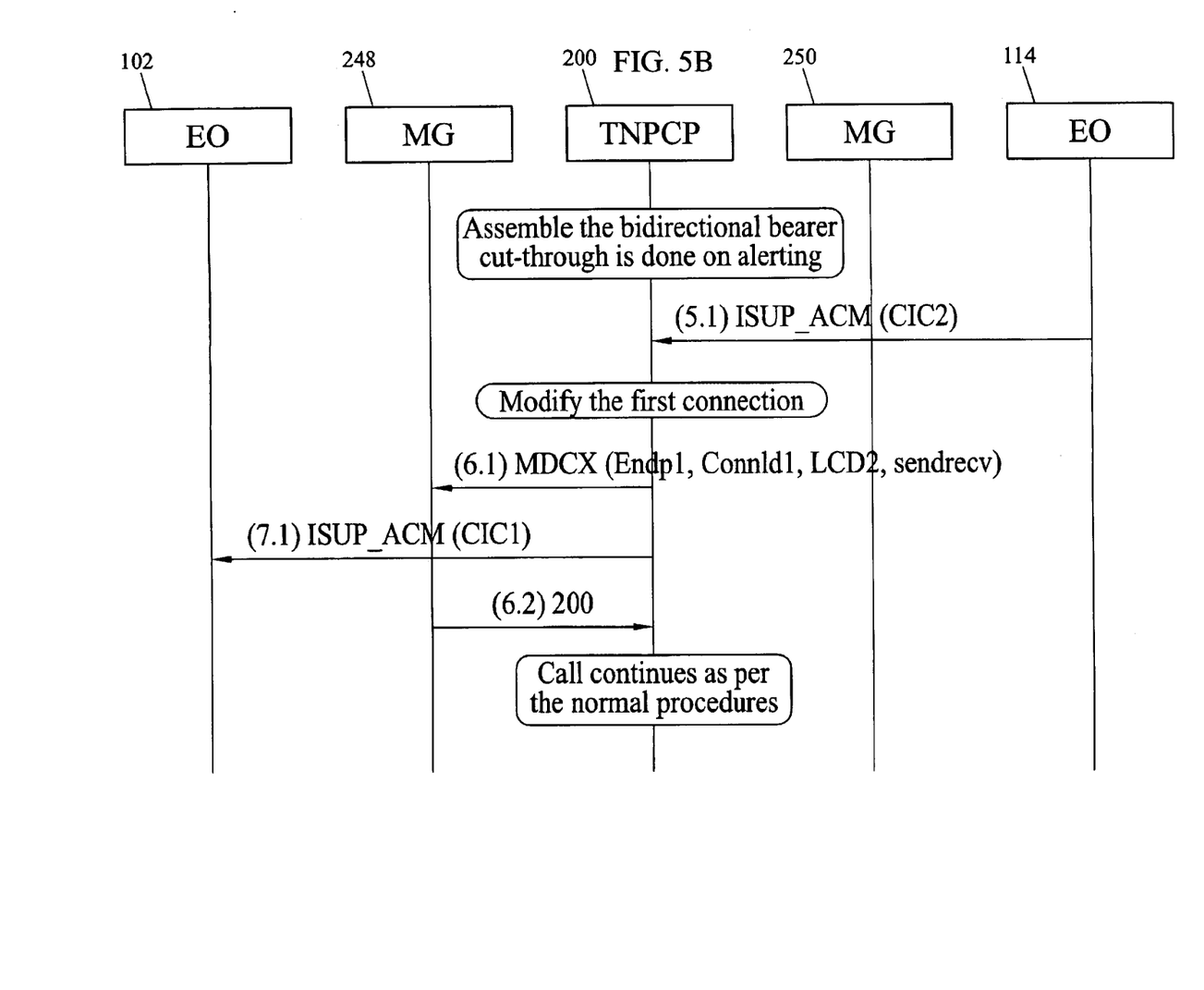
Figure 6A:
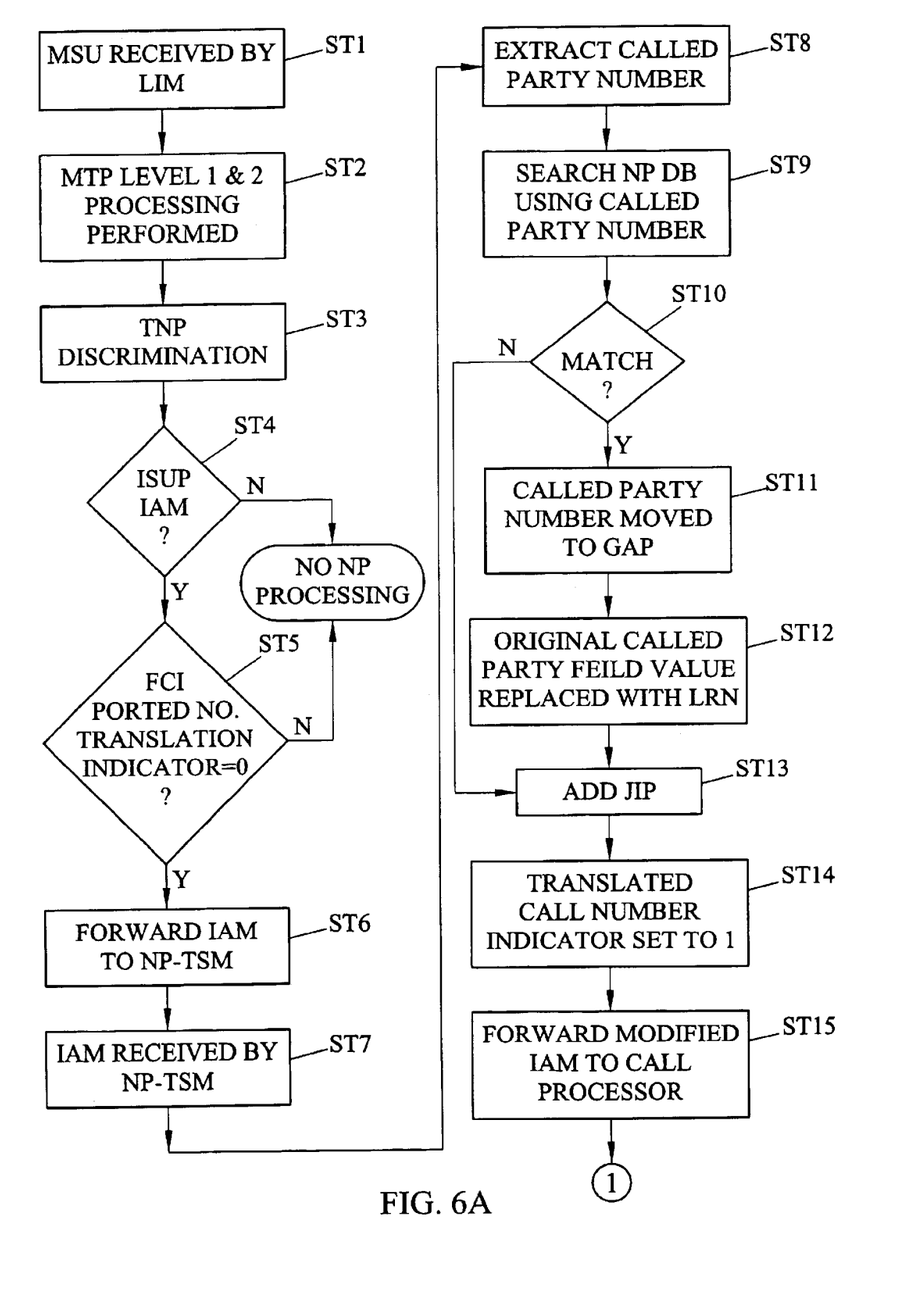
FIGS. 6A and 6B are flow chart diagrams illustrating exemplary triggerless processing according to an embodiment of the present invention.
Figure 6B:
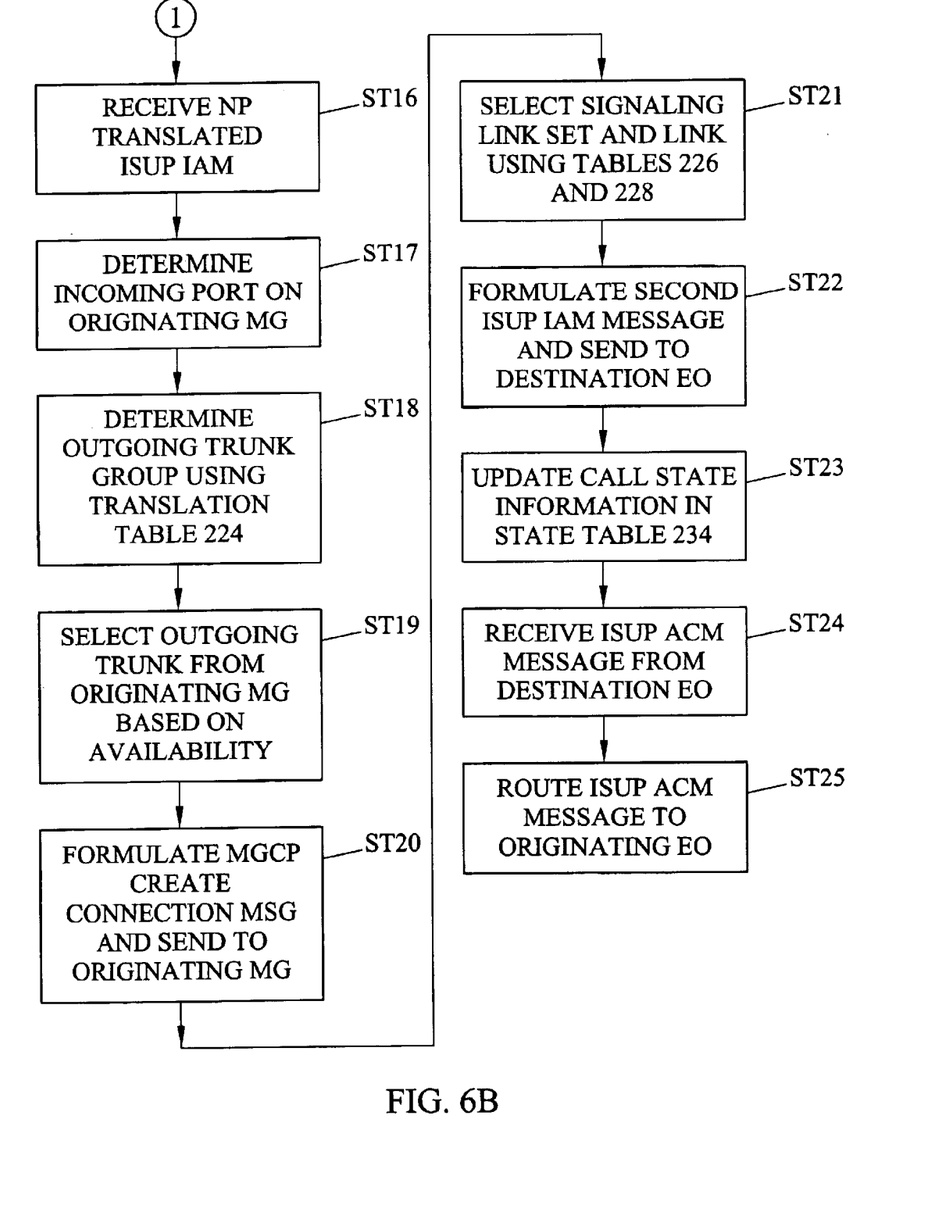

FIGS. 5A and 5B are a call setup messaging diagram, which illustrates the progression of signaling messages associated with a call that is placed to a ported subscriber in network 245. Also, FIGS. 6A and 6B are a process or flow diagram associated with the internal operation of triggerless NP call processing node 200, as related to the call setup scenario depicted in FIGS. 4, 5A, and 5B.

Beginning with FIG. 4, when calling party 104 attempts to place a call to called party 116, originating EO 102 first selects an outgoing trunk circuit to MG 248 and subsequently formulates an ISUP IAM, which identifies the selected trunk circuit. The ISUP IAM is transmitted to TNP call processing node 200. The communication of this ISUP IAM message is identified as step 1.1 in FIG. 5A.

Originating EO 102 serving calling party 104 has no knowledge that called party 116 is no longer being served by EO 114. As such, originating EO 102 performs trunk circuit selection based on the incorrect assumption that EO 112 is the terminating end office in the call.

By organizing a network in the manner taught by the present invention, the inefficiency associated with outbound trunk circuit selection at an originating EO in the case of a call to a ported subscriber is minimized or eliminated. That is, if trunk circuits from an originating EO are terminated at one or more MG nodes, then the first "leg" or trunk segment of a call is made independently of the destination EO. Once the first "leg" or trunk segment has been established between the originating EO and the MG, triggerless number portability translation processing may be performed to ensure that subsequent call setup signaling messages are routed to the correct ported destination EO facility. In the present embodiment, such triggerless number portability processing is performed at TNP call processing node 200. TNP processing may also be performed at a signal transfer point (STP), as described in the above-referenced TNP Patent Application. An alternate embodiment of the present invention, which incorporates TNP translation functionality within an STP will be described below.

Returning to FIG. 2, the path of a typical SS7 ISUP IAM signaling message requiring triggerless NP translation service is traced from reception at the call processing node 200 by inbound LIM 202, through the TNP translation process, and on to the outbound transporter module 208. Again, a detailed flow chart of triggerless number portability translation related processing is presented in FIGS. 6A and 6B, and may be used in conjunction with the schematic diagram shown in FIG. 2 to better understand the triggerless NP translation at call processing node 200.

Beginning with step ST1 in FIG. 6A, an incoming ISUP IAM message is received at the inbound LIM module 202. In step ST2, the incoming ISUP IAM message is received and processed by the MTP Level 1 and 2 process 212. As stated above, MTP level 1 and 2 processing includes error detection, error correction, sequencing, and communicating with network communications hardware. With MTP Level 1 and 2 processing complete, the signaling message packet is temporarily buffered in the I/O queue 214 before being passed up the stack to the MTP Level 3 message discrimination process 216. Discrimination process 216 examines the incoming message to determine whether the message is to be allowed into the switch for further processing. Such gateway screening may involve examination and analysis of origination point code (OPC) and/or destination point code (DPC) values contained in the received signaling message.

As indicated in step ST3, HMDC process 216 also determines whether TNP processing is required priorto further call processing. In one embodiment, TNP service selection involves examination of service indicator (SI) and message type parameters contained within the received SS7 signaling message, in order to determine whether the message is an ISUP IAM message (ST4). A forward call indicator (FCI) ported number translation indicator parameter contained in the ISUP IAM message is also examined in order to determine whether the message requires NP translation processing. In one embodiment, an FCI ported number translation indicator value of zero indicates that NP translation processing has not already been performed on the message (ST5). As indicated in step ST6, if TNP service is indicated, the message is forwarded to NP-TSM module 206. In the example illustrated in FIG. 2, HMDC process 216 determines that the message is permitted to enter the switch, that the message is an ISUP IAM message that has not previously undergone NP translation, and consequently that additional TNP processing is indicated. HMDC process 216 may encapsulate the ISUP IAM message within an SCCP packet before forwarding the message to another processing module for further processing within TNP call processing node 200.

As indicated in step ST7, the ISUP IAM message is forwarded to and subsequently received by NP-TSM module 206. NP database controller 238 decodes the message packet and extracts a called subscriber or called party identifier from a called party field in the message (ST8), where the called party identifier may be a dialed wireline telephone number or a mobile subscriber number (e.g.,. MSISDN). NP database 236 is searched using at least a portion of the called party identifier (ST9). Additional parameters may be used in conjunction with the called party identifier to perform an NP translation lookup, including a nature of address indicator and a numbering plan indicator.

If a matching entry is located in NP database 236, the contents of the called party field in the message are transferred to a generic address parameter (GAP) that is also contained in the message (steps ST10 and ST11). With the original called party field contents relocated to the GAP field, an LRN value returned from the matching NP database entry is encoded in the called party address field (ST12).

As further indicated in step ST13, a value known as a jurisdiction information parameter (JIP) may be incorporated into the message under certain conditions. The JIP is used in some NP type applications to support billing systems. Such telecommunication billing systems might otherwise have difficulty determining the correct billing for an originating number that has been ported. As such, a valid JIP contains a value that represents the origin of the call. The value may be some of the digits from the calling party address or, alternatively, an identifier associated with the end office that originated the call. A service provider may negotiate to use a single JIP to represent all messages from its own network, or a service provider may chose to provide a list of the exchanges in its network that can be used as the JIP value. In call processing node 200 shown in FIG. 2, a JIP parameter may be added to the ISUP IAM message by database controller 238 if a JIP does not already exist in the original message and a JIP value is provisioned in NP database 236. A JIP parameter may also be added by database controller 238 if the original IAM MSU contains a valid calling party identifier but does not already contain a JIP value. If a matching entry is not located in the NP database, a JIP parameter may still be added to the message (steps ST10 and ST13). In step ST14, the FCI ported number translation indicator parameter contained within the ISUP IAM message may also be set to a value of one, indicating that NP translation processing has been performed on the message.

With TNP processing complete, the modified ISUP IAM message is passed to HMRT routing process 240. In step ST15, HMRT process 240 on TNP-TSM 206 performs call server selection based on the OPC, DPC, and CIC parameters in the NP-translated SS7 message and routes the message to the appropriate call server module for further processing.

FIG. 6B illustrates exemplary steps that may be performed by call server and transporter modules 204 and 208 in setting up a call. Continuing with the message processing flow described in FIG. 6A, in step ST16, call server module 204 receives the NP-translated ISUP IAM message. Call server module 204 determines the incoming port on media gateway 248 using the OPC, DPC, and CIC codes in the message (ST17). In step ST18, a trunk group for the outgoing trunk is determined using the translated called party number and translation table 224, shown in FIG. 3. In FIG. 3, translation table 224 indicates that the called party digits 919-787-xxxx correspond to trunk group TG 1.

In step ST19, an outgoing trunk in trunk group 1 is selected. This selection may be performed by choosing the next available circuit within the trunk group. In this example, it is assumed that the trunk corresponding to CIC code 2 is the first available trunk in the trunk group. In step ST20, a media gateway control protocol (MGCP) Create-Connection (CRCX) message is formulated and sent to media gateway 248. This message may be formulated by transporter module 242 illustrated in FIG. 2 based on parameters received from call server module 204. In this example, the outgoing connection from media gateway 248 may be IP, ATM, frame relay, TDM, or any other suitable protocol for carrying the media stream between the called and calling parties.

In order to determine the parameters that must be included in the CreateConnection message, call server module 204 may access endpoint table 230 illustrated in FIG. 3. In this example, since the trunk group is TG 1, the OPC is 1-1-10, and the CIC code is 2, the outgoing port on media gateway 248 is port number 2533. The connection ID assigned to the connection in media gateway 248 is 0. Accordingly, call processing node 200 formulates an MGCP CreateConnection message with the following parameters:

ID=0, EP_ID=1002, SEC EP_ID=2533.

Media gateway 248 uses the information in the CreateConnection message to set up an internal connection between the TDM trunk connected to EO 108 and a packet-based "trunk" (e.g., IP, ATM, frame relay, etc.) that is also connected to the MG. In response to the MGCP CreateConnection message, media gateway 248 returns connection identifiers corresponding to each endpoint of the connection at the media gateway, as indicated in steps 2.1 and 2.2 in FIG. 5A. In this example, the connection identifier for the first endpoint is assumed to be 89 and the connection identifier corresponding to the second endpoint of the connection is 90. These parameters are stored in connection table 232 illustrated in FIG. 3.

In steps ST21 and ST22, TNP call processing node 200 determines data to be included in a second IAM message that is formulated and sent to end office 114, where this second IAM message contains information that is relevant to the selection of the outgoing trunk between end office 114 and media gateway 250. In order to make this determination, TNP call processing node 200 uses routing table 226 and signaling table 228 illustrated in FIG. 3. Referring to routing table 226, if the trunk group is TG 1, the SS7 routing set is RS1. Referring to signaling table 228, if the routing set is RS1, the destination point code is 1-1-10, and the linksets are LS1 and LS2. TNP call processing node 200 routes the second IAM message to end office 110, as indicated in step 3.1 of FIG. 5A. Again, if no number portability translation processing had been performed, the second IAM message would have been formulated for and delivered to EO 112. In this example, the parameters that may be included in the second IAM message are:

OPC=2-1-1, DPC=1-1-10, CIC=2, ClgPty=919-460-5500, CldPty=919-787-8009.

The second IAM message instructs end office 114 to set up a trunk corresponding to CIC code 2.

In an manner similar to that described previously, a second MGCP CRCX message is formulated by TNP call processing node 200 and sent to media gateway 250, as shown in step 4.1 of FIG. 5A. MG 250 uses the information in the CRCX message to set up an internal connection between the TDM trunk connected to EO 114 and a packet-based "trunk" (e.g., IP, ATM, frame relay, etc.) connected to the MG. In response to the MGCP CreateConnection message, media gateway 250 returns connection identifiers corresponding to each endpoint of the connection at the media gateway, as indicated in step 4.2 in FIG. 5A. In step ST23, call processing node 200 updates call state information in state table 234. State table 234 preferably contains an entry for each defined endpoint. In the illustrated example, the endpoint corresponding to port 1001 in media gateway 248 is in the state "RECEIVED IAM," indicating that an IAM message has been received for that endpoint. Endpoint ID 2533 is in the state "GENERATED IAM, WAITING FOR ACM," indicating that this endpoint is waiting for an address complete message. Step ST23 is preferably performed any time a message relating to a connection is sent or received.

In step ST24, TNP call processing node 200 receives an ACM from end office 110. TNP call processing node 200 may generate and send a modify connection (MDCX) message to MG 248, which may subsequently respond with a connection information message, as indicated in steps 6.1 and 6.2 in FIG. 5B. The ACM message is then forwarded to the originating end office 102, as shown in ST25 and step 7.1 in FIG. 5B. When the called party answers the call, an answer (ANM) message is sent from destination end office 114 through TNP call processing node 200 to originating end office 102. The ANM message follows the same path as the ACM message. Once the ANM message is received, a voice connection is established between the two end offices via media gateways 248 and 250.

Referring back to FIG. 2, transporter module 208 includes upper layer protocol converter 242 for converting between SS7 and an IP telephony protocol, such as MGCP, SIP, or any of the other protocols discussed above. Transporter module 208 also includes SS7-to-IP converter 244 for converting between SS7 and IP address schemes.

The call setup example presented in FIGS. 5A and 5B and described above is merely one of many possible call setup scenarios that may be encountered in a communications network. Different call setup scenarios may require variations of the messaging described above, however the basic functionality and advantage provided by a triggerless NP call processing node remains essentially the same. That is, by employing a triggerless NP call processing node (or equivalent triggerless NP translation capability) in combination with TDM-to-packet based media gateway nodes, highly efficient number portability service may be provided within a communication network without requiring upgrades to existing EO or MSC facilities and without unnecessarily tying up voice trunks that are not in the call path.

In the example illustrated in FIG. 2, triggerless number portability processing functionality is located within TNP call processing node 200. In an alternate embodiment of the invention, NP database 236 as well as some or all of the functionality provided by NP database controller 238 may be located external to triggerless NP call processing node 200.

Figure 7:
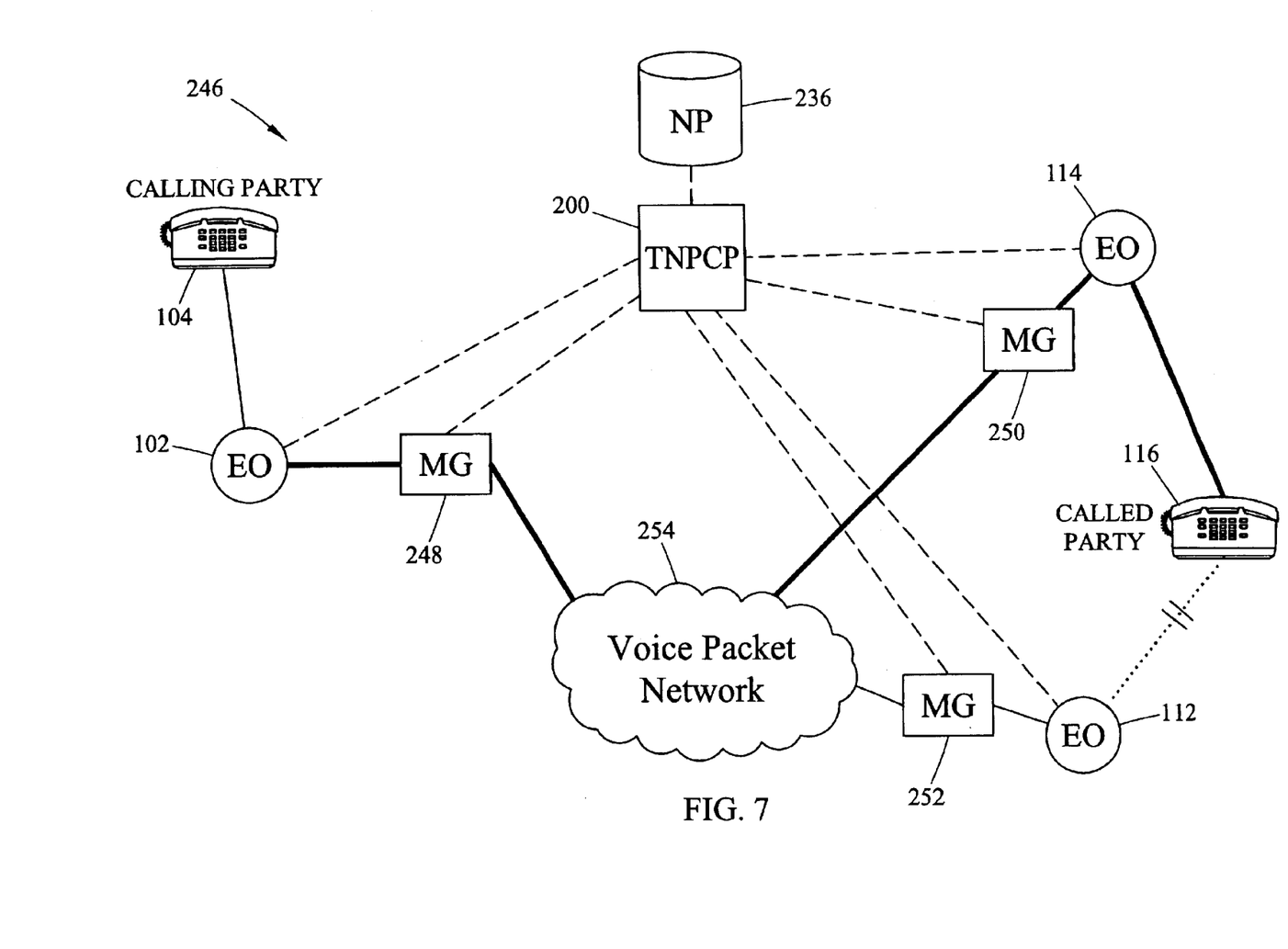
FIG. 7 is a network diagram illustrating an alternate embodiment of a triggerless NP call processing system of the present invention that includes an external NP database.

That is, NP database 200 need not be located on a TNP-TSM card located within TNP call processing node 200. In one embodiment, an external NP database may be connected to TNP call processing node 200 via an Ethernet or other point-to-point connection. Such a system and network architecture is illustrated in FIG. 7.

STP Based Triggerless NP Call Processing System

Figure 8:
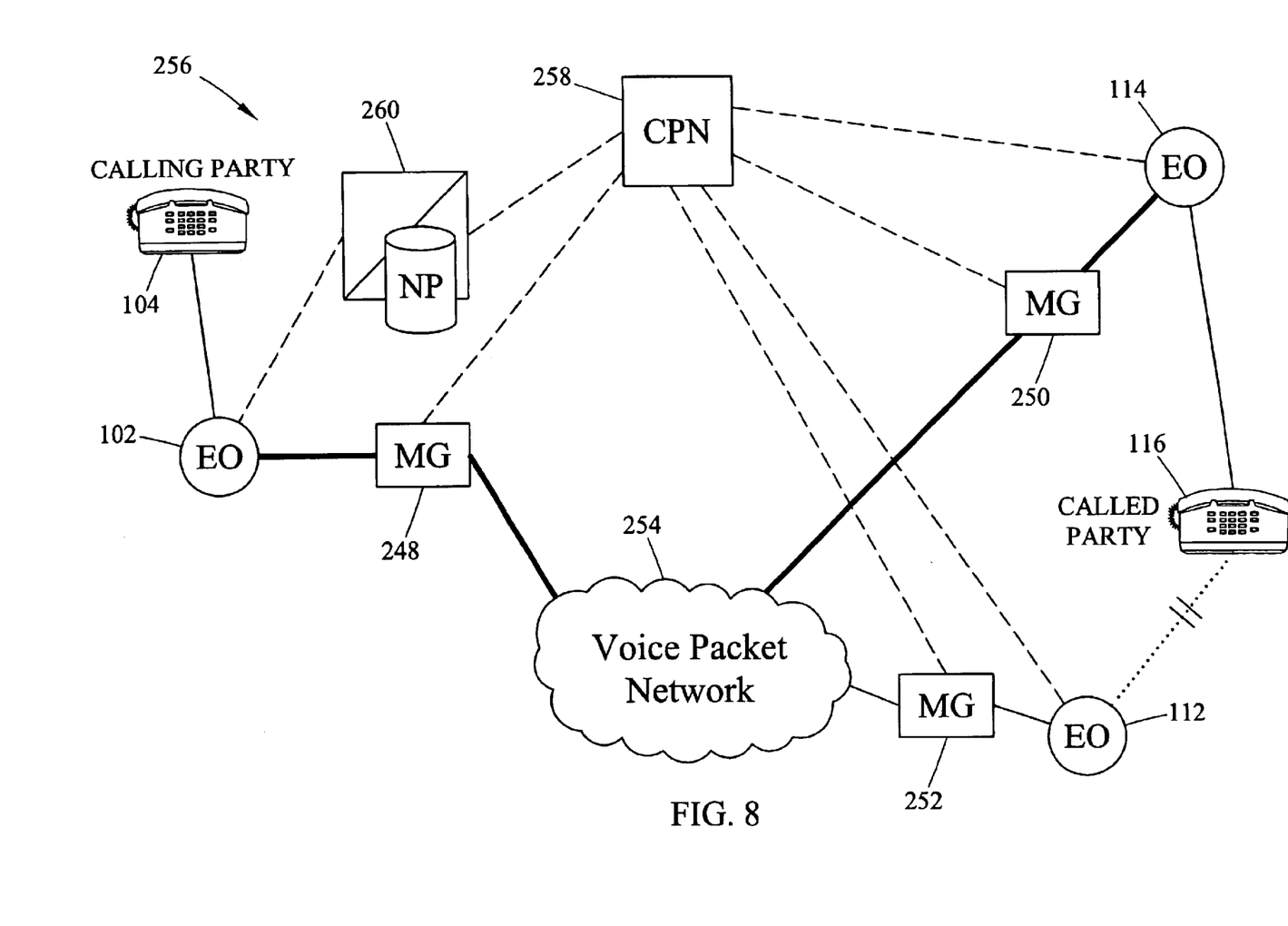
FIG. 8 is a network diagram illustrating an alternate embodiment of a triggerless NP call processing system of the present invention that includes a signal transfer point node for performing triggerless NP translation processing.

In the embodiment illustrated in FIG. 2, TNP call processing functionality was located on a call processing node with call signaling (MGC) and message routing (STP) functionality. In an alternative embodiment of the present invention, an STP with triggerless NP processing capability may be deployed in conjunction with a call processing node (e.g., MGC, Softswitch, etc.) and one or more media gateway nodes to provide efficient triggerless NP service in a communications network. A communication network 256 is illustrated in FIG. 8, which includes a call processing node 258 and an STP 260 for providing triggerless NP processing service. Again, a thorough discussion of STP-based triggerless NP functionality is described in the above-referenced TNP Patent Application. As the call setup messaging flows associated with the network architecture shown in FIG. 8 are similar to those described for the previous embodiments, a detailed discussion of call setup signaling is not repeated herein.

In a triggerless NP system such as that shown in FIG. 8, number portability translation processing is performed by a TNP-capable, STP-like routing node on a call setup signaling message prior to receipt of the message by a call processing node. For example, an ISUP IAM call setup signaling message launched by EO 102 may be routed to and subsequently processed by TNP-STP 260. TNP-STP 260 may examine one or more parameters in the ISUP IAM message and perform a triggerless NP translation using some or all of these parameters. TNP-STP 260 may then forward the translated call setup signaling message to call processing node 258. Call processing node 258 proceeds with call setup and call setup routing operations, as described above and subsequently facilitates the establishment of a call between calling party 104 and called party 116 via MG nodes 248 and 250.

A triggerless number portability system architecture such as that illustrated in FIG. 8 may enable wireline and wireless network operators to quickly and efficiently implement number portability support in their existing network infrastructures which contain legacy EO and MSC equipment. In addition, the problem of inefficient trunk usage for number portability calls is mitigated.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for improving media trunk utilization for calls directed to ported numbers, the method comprising:
at a routing node:
 (a) receiving a first call setup message associated with a call in a communications network;
 (b) determining whether the call is directed to a ported directory number;
 (c) in response to determining that the call is directed to a ported directory number, extracting called party information from the call setup message and performing a lookup in a number portability database using the called party information to locate a routing number for the called party;
 (d) selecting an outgoing media trunk from a media gateway for the call based on the routing number;
 (e) forwarding a media-gateway-compatible message to the media gateway associated with the media trunk; and
 (f) formulating a second call setup message and forwarding a second call setup message to an end office to which the directory number has been ported.

2. The method of claim 1 wherein receiving a first call setup message includes receiving an ISUP IAM message.

3. The method of claim 2 wherein receiving an ISUP IAM message includes receiving an ISUP IAM message from a PSTN end office.

4. The method of claim 2 wherein receiving an ISUP IAM message includes receiving an SUP IAM message from a mobile switching center.

5. The method of claim 1 wherein determining whether the call is directed to a ported directory number includes examining at least one parameter in the first call setup message.

6. The method of claim 1 wherein performing a number portability lookup using called party information includes performing a number portability lookup based on the directory number extracted from the first call setup message.

7. The method of claim 1 wherein selecting a media trunk includes selecting a trunk group and selecting an available trunk within the trunk group.

8. The method of claim 1 wherein forwarding a media-gateway-compatible message to the media gateway includes formulating an MGCP message based on the first call setup message and sending the MGCP message to the media gateway.

9. The method of claim 1 wherein forwarding a media-gateway-compatible message to the media gateway includes formulating an H.225 message based on the first call setup message and sending the H.225 message to the media gateway.

10. The method of claim 1 wherein forwarding a media-gateway-compatible message to the media gateway includes formulating a SIP message based on the first call setup message and sending the SIP message to the media gateway.

11. The method of claim 1 wherein the routing node comprises a media gateway controller.

12. The method of claim 1 wherein the routing node comprises an STP.

13. A routing node for improving media trunk utilization for calls directed to ported numbers, the routing node comprising:
 (a) a link interface module for receiving a first call setup message associated with a call in a communications network;
 (b) a discrimination process operatively associated with the link interface module for determining whether the call is directed to a ported directory number;
 (c) a number portability database manager for receiving the first call setup message from the discrimination process in response to a determination that the call is directed to a ported directory number, and, in response, for performing a lookup in a number portability database to locate a routing number for the call;
 (d) a call processor for receiving the first call setup message from the number portability database manager and for selecting an outgoing media trunk from a media gateway for the call based on the routing number; and
 (e) a transporter module operatively associated with the call processor for forwarding a media-gatewaycompatible message to media gateway associated with the media trunk and for forwarding a second call setup message to an end office to which the directory number has been ported.

14. The routing node of claim 13 wherein the link interface module comprises an SS7 link interface module.

15. The routing node of claim 13 wherein the link interface module comprises an ATM link interface module.

16. The routing node of claim 13 wherein the link interface module comprises an IP interface module.

17. The routing node of claim 13 wherein the discrimination process is adapted to identify ISUP IAM messages as candidates for number portability lookups.

18. The routing node of claim 17 wherein the number portability database manager is adapted to perform number portability database lookups based on the ISUP IAM messages.

19. The routing node of claim 13 wherein the call processor is adapted to select a media trunk group based on the routing number in the first call setup message and a media trunk in the trunk group based on media trunk availability.

20. The routing node of claim 19 wherein the call processor is adapted to select a media gateway corresponding to the media trunk.

21. The routing node of claim 13 wherein the media-gateway-compatible message comprises a media gateway control protocol message.

22. The routing node of claim 13 wherein the media-gateway-compatible message comprises a session initiation protocol message.

23. The routing node of claim 13 wherein the media-gateway-compatible message comprises an H.225 message.

24. The routing node of claim 13 wherein the link interface module, the discrimination process, the number portability database manager, the call processor, and the transporter module are located within a media gateway controller.

25. The routing node of claim 13 wherein the link interface module, the discrimination process, the number portability database manager, the call processor, and the transporter module are located within a signal transfer point.

26. The routing node of claim 24 wherein the number portability database manager is adapted to access a number portability database located within the media gateway controller.

27. The routing node of claim 24 wherein the number portability database manager is adapted to access a number portability database located external to the media gateway controller.

28. The routing node of claim 25 wherein the number portability database manager is adapted to access a number portability database internal to the signal transfer point.

29. The routing node of claim 25 wherein the number portability database manager is adapted to access a number portability database located external to the signal transfer point.

30. A computer program product comprising computer-executable instructions embodied in a computer-readable medium for performing steps comprising:

at a routing node:

(a) receiving a first call setup message associated with a call in a communications network;

(b) determining whether the call is directed to a ported directory number;

(c) in response to determining that the call is directed to a ported directory number, extracting called party information from the call setup message and performing a lookup in a number portability database using the called party information to locate a routing number for the called party;

(d) selecting an outgoing media trunk from a media gateway for the call based on the routing number;

(e) forwarding a media-gateway-compatible message to the media gateway associated with the media trunk; and (f) formulating a second call setup message and forwarding a second call setup message to an end office to which the directory number has been ported.

31. The computer program product of claim 30 wherein receiving a first call setup message includes receiving an ISUP IAM message.

32. The computer program product of claim 31 wherein receiving an ISUP IAM message includes receiving an ISUP IAM message from a PSTN end office.

33. The computer program product of claim 31 wherein receiving an ISUP IAM message includes receiving an ISUP IAM message from a mobile switching center.

34. The computer program product of claim 30 wherein determining whether the call is directed to a ported number includes examining at least one parameter in the first call setup message.

35. The computer program product of claim 30 wherein performing a number portability lookup using called party information includes performing a number portability lookup based on the directory number extracted from the first call setup message.

36. The computer program product of claim 30 wherein selecting a media trunk includes selecting a trunk group and selecting an available trunk within the trunk group.

37. The computer program product of claim 30 wherein wherein forwarding a media-gateway-compatible message to a media gateway includes formulating an MGCP message based on the first call setup message and sending the MGCP message to the media gateway.

38. The computer program product of claim 30 wherein wherein forwarding a media-gateway-compatible message to a media gateway includes formulating an H.225 message based on the first call setup message and sending the H.225 message to the media gateway.

39. The computer program product of claim 30 wherein wherein forwarding a media-gateway-compatible message to a media gateway includes formulating a SIP message based on the first call setup message and sending the SIP message to the media gateway.

40. The computer program product of claim 30 wherein the routing node comprises a media gateway controller.

41. The computer program product of claim 30 wherein the routing node comprises an STP.

\* \* \* \* \*